Jan. 12, 1943. W. T. GOLLWITZER Re. 22,249

ADDRESS PLATE

Original Filed May 23, 1932

Inventor

Walter T. Gollwitzer,

By Bates, Gobrick & Tear

Attorneys

Reissued Jan. 12, 1943

Re. 22,249

UNITED STATES PATENT OFFICE 22,249

ADDRESS PLATE

Walter T. Gollwitzer, Euclid Village, Ohio, assignor, by mesne assignments, to Addressograph-Multigraph Corporation, Cleveland, Ohio, a corporation of Delaware Original No. 2,030,865, dated February 18, 1936, Serial No. 612,955, May 23, 1932. Application for reissue April 3, 1942, Serial No. 437,562

17 Claims. (Cl. 101—369)

Figure 1:
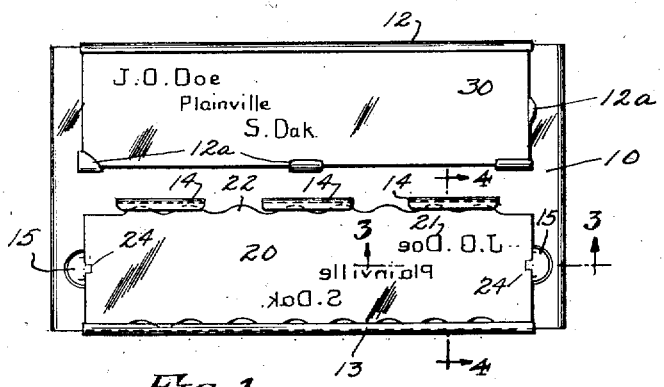

This invention relates to an address plate comprising a holder having mounted thereon an embossed printing plate. The invention relates to such mutual formation of the frame and the printing plate as will enable the very ready installation or removal of the printing plate from the frame, but will result in the effective holding of the printing plate when in place.

In carrying out the invention I provide the frame with overhanging retaining ledges beneath which a printing plate may be slid, the frame having retaining means to coact with recesses in the ends of the printing plate to properly center the printing plate, whereby such plate may be quite loose so far as the lips are concerned, and thus easily installed or removed, and still be accurately held against shifting in the plane of the plate by the end engagement.

More particularly, I provide a stamped sheet metal frame which has one edge curled over above the surface of the frame and has struck-up lips also raised above the surface of the frame and projecting toward the curled-over edge, the curled-over edge and lips providing means for holding a loose embossed printing strip down on the frame; and I provide the frame also with a pair of tongues cut from the body of the frame and having upstanding abutments with projections toward each other, these projections being adapted to engage notches formed in the end of the printing strip. By notching the end portions of the printing plate, I form intermediate longitudinal boundary edges on the plate, which constitute shoulders adapted to engage the side surfaces of the abutment projections, whereby such projections serve to prevent shifting of the printing plate transversely of its length. Either abutment may be depressed manually so that the printing strip can be readily shoved into place over such abutment and slid loosely beneath the retaining edge and lips until it engages the opposite abutment, whereupon the abutment over which it was slid rises to act against the plate at that end and prevent its removal.

The abutment projections, by entering the notches of the printing strip, center it so that the printing lines will come exactly in the desired place, while the lips and curled edge serve to hold the printing strip down on the frame; but, as they are not relied upon to limit the shifting up and down on the frame, the printing plate may be very loose beneath the edge and lips. This enables the plate to be very readily inserted or removed.

A preferred embodiment of my invention is illustrated in the drawing hereof and is hereinafter described in detail, and the essential and novel features are summarized in the claims.

Figure 2:
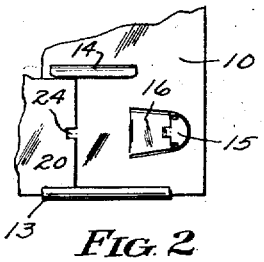
Figure 3:
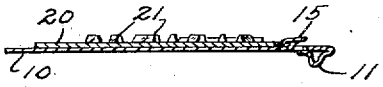
Figure 4:
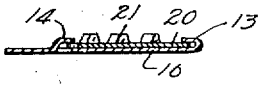
Figure 5:
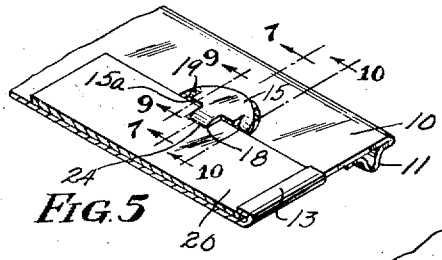
Figure 6:
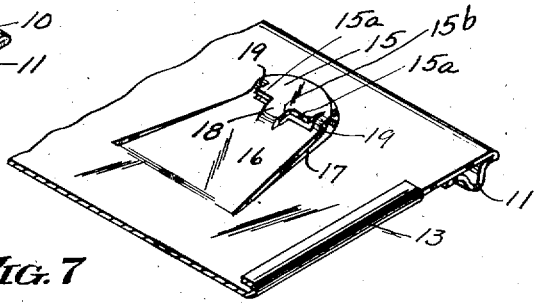
Figure 7:
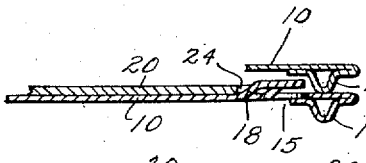
Figure 8:
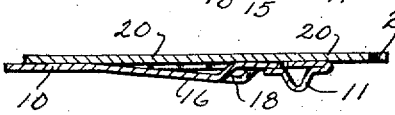
Figure 9:
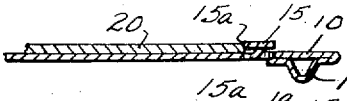
Figure 10:
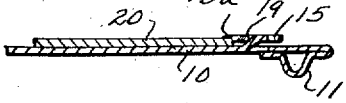

Fig. 1 is a plan of my address plate complete; Fig. 2 is a fragmentary plan of a portion of the plate with the printing member moved away from one end; Fig. 3 is a transverse section lengthwise of the printing member on the line 3—3 in Fig. 1; Fig. 4 is a section at right angles to Fig. 3 as indicated by the line 4—4 on Fig. 1; Fig. 5 is a perspective of a portion of the address plate with the printing member mounted thereon; Fig. 6 is a perspective of the address plate with the printing member removed; Fig. 7 is a fragmentary longitudinal section on the line 7—7 on Fig. 5, showing the printing plate in place; Fig. 8 is a section in the same plane, showing the plate in the act of being removed; Figs. 9 and 10 are sections through the address plate and printing plate in place, taken on the correspondingly numbered lines on Fig. 5.

The complete device, often called an "address plate," consists of the frame 10, and the embossed printing plate 20 mounted thereon, though, if desired the frame may carry also an index card shown in Fig. 1 at 30. As shown, the printing plate 20 is a strip of comparatively soft metal embossed with upwardly projecting printing characters 21. The longitudinal edges of the plate are preferably of a sinuous character as shown at 22 and in the extreme ends of the plate, adjacent the center of such ends are located notches 24, preferably of rectangular form to present parallel opposite edges.

The frame 10, as shown in the drawing, comprises a sheet metal member having its ends bent beneath it and bowed to provide hollow supporting and stiffening ribs 11. The top and bottom edges 12 and 13 of the plate are curled over in a U-shape to lie above the plane of the plate, and the plate has a series of lips 14 struck up from the plate and projecting toward the curled edge 13. The body of the plate, the curled-over edge and the lips provide a guideway into which the printing plate 20 may be slid lengthwise of the plate.

To limit the movement of the printing plate in either longitudinal direction, I employ the feature of abutments 15 made of the body of the frame and coacting with the opposite ends of the printing plate. These two abutments are duplicates in formation, and each is formed by an upward distortion of a portion of a spring tongue 16 cut out of the body of the plate by means of an approximately U-shaped slit 17.

My abutment 15, however, is made in peculiar form, as I will now describe. The upward distortion of the tongue provides an approximately semi-circular lip at the extreme end of the tongue and raised above the plane of the plate. This raising is effected by bending upwardly gradually the central region 18 of the tongue and two extreme regions 19, while between each extreme region and the central connection is a sheared portion 15*a* on opposite sides of the central connection 18.

The central raised region has parallel opposite edges and the inner edges of the extreme regions are preferably also parallel with such central edges. This is effected by continuing the shearing region a short distance in opposite directions from the opposite ends of the transverse shear, which defines the portion 15*a*. The result is that these portions 15*a* present two vertical edges which extend from a slight distance above the plane of the tongue 16 upwardly at right angles thereto for a height which is approximately the same as the thickness of the printing plate 20. These edges thus present abrupt shoulders engaging the end of the plate and preventing longitudinal shifting. The parallel sides of the central connecting portion 18 likewise present abrupt shoulders, and these latter shoulders, by engaging the parallel walls of the notches 24 of the plate, prevent shifting of the plate transversely of itself.

When the printing plate is to be inserted on the frame, the operator holds the frame in one hand and the printing plate in the other, with a portion of the printing plate overlapping the abutment 15; then, by a slight pressure depresses the abutment, as is readily allowed by the cut-out spring tongue 16; he then shoves the printing plate lengthwise over the depressed abutment and into the guide provided by the plate edge 13 and lips 14 until the printing plate comes into its final position, where it is stopped by abutting the edges 15*a* of the abutment toward which the plate was shoved. At the same time that this engagement takes place, the freed abutment, over which the plate was passed, springs up and its edges 15*a* stand in the path of that end of the printing plate, while the two connecting portions 18 on the abutments enter the two notches 24 in the printing plate, so that the printing plate is locked against movement in either longitudinal or transverse direction.

To remove the printing plate, the operator presses down one of the abutments 15, which may be very readily effected manually by pressure of the thumb against the abutment, and then gives a slight longitudinal movement to the printing plate to cause it to pass over the abutment. The abutment is thus held down in idle position and the printing plate may be very quickly extracted.

It should be noticed particularly that, by reason of the central extension 18 in the abutment occupying the notch in the printing plate, it is not necessary to rely on the lips or curled edges of the carrier plate to prevent transverse movement of the printing plate; and hence the printing plate may fit loosely enough beneath the curled edge and lips so that it may be very easily inserted or removed.

It should be noted, also, that by reason of confining the abutting surfaces 15*a* to the two intermediate regions between the central portion 18 and the extreme portions 19, I can make such central and extreme portions gradually inclined and thus readily connect the raised portion of the abutment 15 with the tongue portion without danger of breaking the metal. The inclines of the extreme portions extend back from the end of the printing plate (see Fig. 10); while the central inclined region occupies the printing plate notch 24 (Figs. 5 and 7), so that neither of these connecting portions interfere with the printing plate coming against the abrupt stopping surfaces 15*a* which stand normal to the plane of the carrier plate and thus effectively abut the ends of the printing plate, as shown in Figs. 1, 5 and 9.

It will be noted from Fig. 7 that the outer ends of the abutment lips 15 are farther from the plate end than the supporting ribs 11, and accordingly these abutment lips do not in any manner interfere with the stacking of the plates on each other as illustrated in Fig. 7.

In Fig. 1, I have shown the top edge of the plate curled-over at 12 to cooperate with lips, corner pocket, and end stops (all designated 12*a*) to retain the index card 30. But such features are optional.

I claim:

1. A frame having a spring tongue formed of the material of the frame with a stamped-up end to form a lip, the raised portion being connected with the body of the tongue by an inclined central portion and being separated from the body on opposite sides of the central portion to provide abrupt shoulders, said frame being formed to carry a printing plate having a notch in its end adapted to receive the central connecting region of the abutment when the abrupt shoulders engage the end of the plate.

2. A frame having a spring tongue formed of the material of the frame with a stamped-up end forming a raised portion, the raised portion being connected with the body of the tongue by an inclined central portion and being separated from the body on opposite sides of the central portion to provide abrupt shoulders, and being connected with the tongue by portions beyond the abrupt shoulders, the extreme connecting regions of the raised portion of the tongue being behind the line defining the abrupt shoulders.

3. The combination of a frame and a printing plate adapted to be mounted thereon, the printing plate having a notch in its end and the frame having a depressable spring tongue with raised portions presenting shoulders at right angles to each other abutting the end of the plate and a wall of the notch, respectively, and thus restricting the plate against longitudinal and transverse movement.

4. A frame for carrying a printing plate having a notch in its end characterized in that the frame has a depressable spring tongue with a raised portion presenting an abrupt shoulder adapted to engage the printing plate outside of the notch, said raised portion being connected with the tongue proper by a less abrupt portion adapted to enter the notch of the plate.

5. A frame for carrying a printing plate having a notch in its end, characterized in that the frame has a tongue made out of the body of the frame and lying for the most part normally in the general plane of the frame, but with a raised portion adjacent its free end, said raised portion presenting a pair of abrupt shoulders adapted to engage the end of the plate on opposite sides of the notch, and an intermediate portion leading from the raised part in the direction away from the end of the tongue and gradually joining the body of the tongue and adapted to occupy the notch in the end of the plate.

6. A frame having a depressable spring tongue formed of the material of the frame with a stamped-up portion presenting two connected abutments having abrupt surfaces at right angles to each other, one of the surfaces being adapted to engage the end wall of a plate on the frame and the other a side wall of a notch in the end portion of such plate.

7. A metal frame having a spring tongue formed of the metal of the frame and a stamped-up end to form a lip, whereby the tongue may be manually depressed, said lip presenting an abrupt shoulder opposite the extreme end of a printing plate to be mounted on the frame, the lip being connected with the body of the tongue by a portion whose top surface gradually merges with the top of the tongue, but whose sides are abrupt in a direction at right angles to the said abrupt surface of the lip.

8. A frame having a longitudinal guideway defined by upwardly projecting portions of the frame which have their edges projecting toward each other to provide a shallow channel into which a printing plate may be slid, depressable abutments carried by the frame and positioned to engage the opposite ends of such printing plate, each abutment being formed on the end portion of a spring tongue cut out of the frame and having its body normally lying in the plane of the frame and adapted to be beneath the printing plate, the abutment being pressed up from the plane of the tongue and having an abrupt shoulder adapted to engage the end of the printing plate, there being also a portion gradually connecting the abutment with the tongue and adapted to occupy a notch in the plate.

9. A frame for carrying a printing plate having a notch in its edge, characterized in that the frame has a depressable spring tongue provided with a raised portion presenting an abrupt shoulder adapted to engage the printing plate outside of the notch, there being also a raised portion of the material of the frame adapted to occupy said notch when the plate is engaging the abutment.

10. The combination of a frame having a resilient tongue provided with a raised abutment and a raised projecting portion at an angle to the active edge of the abutment, and a removable printing plate adapted to be mounted on the frame and formed between its side edges and adjacent one end with a shoulder at an angle to the end, whereby said active edge of the abutment may engage the end of the plate while said projecting portion of the abutment engages said shoulder and whereby the abutment and projecting portion may be depressed to free the plate.

11. An address plate, comprising a frame having retaining devices to engage the side margins of a printing plate and having a spring tongue provided with raised abutment adapted to engage the end of such printing plate but depressable to the level of the frame to free the printing plate, the abutment having a portion connecting it with the tongues and an abrupt shoulder, combined with a printing plate adapted to coact with the retaining devices of the frame and having a recess in its end adapted to receive the said connecting portion of said abutment and contact therewith while the abrupt shoulder of the abutment contacts with the end of the printing plate, whereby longitudinal and transverse movement of the plate is restricted.

12. An address plate, comprising a frame having projecting overhanging retaining devices beneath which a printing plate may be shoved by a movement in its own plane, with the retaining devices extending slightly over the plate, said frame having a spring tongue provided with a raised abutment adapted to engage the end of such printing plate but depressable to the level of the frame, the abutment having a central portion connecting it with the tongue and abrupt shoulders at opposite sides of the central portion, combined with a printing plate adapted to be slid into place lengthwise across the abutment and beneath the overhanging portions of the frame and having a notch in its end adapted to receive the central connecting portion of said abutment, the notch being of such width and so positioned in the plate that a longitudinal wall of the notch may engage said connecting portion and thereby restrict transverse shifting of the plate on the frame while the abrupt shoulders of the abutment may engage the end of the printing plate on opposite sides of the notch and restrict longitudinal movement of the plate.

13. The combination of an elongated printing plate having notches in its opposite ends, the notch at one end being at the same distance from one of the side edges that the notch at the other end is distant from the other side edge, and a frame having retaining devices to overlap the side margins of said printing plate and having a pair of raised abutments which provide shoulders to engage the ends of the printing plate, at least one of said raised abutments being carried by the movable end portion of a spring tongue attached to the frame, whereby that abutment is depressable to the level of the frame to free the plate, said depressable abutment having a connecting portion adapted to occupy the notch in that end of the plate and contact at least one of the longitudinal walls of the notch and thereby restrict transverse shifting of the plate, the location of said depressable abutments having the same relation to the marginal plate engagers of the frame as the notches in the printing plate have to its side edges, whereby said printing plate may be mounted on the frame with either end toward said depressable abutment.

14. The combination of an elongated printing plate having centrally located notches in its opposite ends, and a frame of sheet material having retaining devices to overhang the side margins of said printing plate while allowing a slight transverse shifting, said frame having a pair of spring tongues formed of the material of the frame and adapted for the most part to be substantially in the plane of the frame and underlie the positioned printing plate but which are depressable adjacent their free end below the level of the frame, said tongues having at their free end portions raised abutments which provide shoulders to engage the ends of the printing plate and connecting portions to occupy the notches and engage one or the other of the longitudinal walls thereof as the plate shifts transversely on the frame, the location of said raised abutments being midway between the marginal plate engagers of the frame, whereby said printing plate may be mounted on the frame with either face visible.

15. The combination of a frame, a spring tongue carried thereby, a raised platform on the free end portion of the tongue, an inclined brace extending from the body of the tongue to the edge of the platform, and a notched plate resting on the frame and having its end abutting the edge of the platform and a wall of the notch abutting a side of the brace to restrict both longitudinal and lateral movement of the plate, the platform being depressable to the level of the frame so that the plate may be slid across the platform with the under face of the plate in sliding contact with the top face of the frame.

16. A sheet metal frame having marginal retainers and a printing plate adapted to have its margins overhung by said retainers, a spring tongue cut out from the body of the frame and having its end portion partially severed and raised to make a platform having an abrupt edge adapted to abut the end of the plate but depressable to the level of the frame, said platform being connected with the tongue by a brace leading from the abrupt edge in an inclined direction to the body of the tongue, said plate having a notch adapted to receive said brace, the clearance between a wall of the notch and the adjacent side of said brace being less than the clearance between that edge of the plate which is beyond the other side of the notch and the overhanging retainer therefor, whereby the side of the brace provides a limit for transverse movement of the plate in that direction.

17. A sheet metal frame having raised portions spaced apart and projecting toward each other to provide marginal retainers about a shallow channel, and a printing plate adapted to slide longitudinally into said channel and have its margins overhung by said retainers, a spring tongue cut out from the body of the frame and having its end portion partially severed and raised to make a platform having an abrupt edge adapted to abut the end of the plate but be depressable to the level of the frame, said platform being connected with the tongue by two inclined braces back of the abrupt edge and a third centrally located inclined brace leading from said abrupt edge to the body of the tongue, said plate having a notch adapted to receive said central brace, the clearance between a wall of the notch and the adjacent side of said central brace being less than the clearance between that edge of the plate which is beyond the other side of the notch and the overhanging retainer therefor, whereby the side of the central brace provides a limit for transverse movement of the plate in that direction.

WALTER T. GOLLWITZER.